US012693935B2

(12) United States Patent (10) Patent No.: US 12,693,935 B2
Jamloki et al. (45) Date of Patent: Jul. 28, 2026

(54) HANDLING DATA ERRORS

(71) Applicant: International Business Machines Corporation, Armonk, NY (US)

(72) Inventors: Shailesh Chandra Jamloki, Noida (IN); Awajeet Kumar Arya, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 17/991,949

(22) Filed: Nov. 22, 2022

(65) Prior Publication Data

US 2024/0168850 A1 May 23, 2024

(51) Int. Cl.
G06F 16/00 (2019.01)
G06F 11/14 (2006.01)
G06F 11/1446 (2026.01)
*G06F 16/27* (2019.01)

(52) U.S. Cl.
CPC ...... *G06F 11/1435* (2013.01); *G06F 11/1469* (2013.01); *G06F 16/27* (2019.01)

(58) Field of Classification Search
CPC .. G06F 11/1435; G06F 11/1469; G06F 16/27; G06F 11/2094; G06F 11/2097; G06F 2201/80; G06F 11/0793
See application file for complete search history.

(56) References Cited

U.S. PATENT DOCUMENTS 9,639,436 B2 5/2017 Arnold
10,089,148 B1 10/2018 Blitzer 11,032,361 B1 * 6/2021 Chen .................. H04L 67/1008
11,308,125 B2 * 4/2022 Chen ...................... G06F 16/275
2021/0216509 A1 7/2021 Jayanthi

FOREIGN PATENT DOCUMENTS

AU 2003252183 A1 * 2/2004 ........... G06F 16/273

OTHER PUBLICATIONS

"Data Error," Qlik Replicate, Attunity Ltd., Nov. 2020, 2 pages.
"Administering Oracle GoldenGate Cloud Service for UNIX Testing and Transforming Data," Oracle 1994, 6 pages.
"Setting data translations on column mappings," IBM Documentation, International Business Machines Corporation, Mar. 2021, 3 pages.
"Attunity Replicate Setup and User Guide," Version 6.3, Qlik, Attunity Ltd., Jan. 2019, pp. 1-949.
"Qlik Enterprise Manager Setup and User Guide," Qlik Enterprise Manager, Apr. 2020, Version 6.6, 368 pages.

* cited by examiner

*Primary Examiner* — Alexander Khong

(74) *Attorney, Agent, or Firm* — Tihon Poltavets

(57) ABSTRACT

An approach is disclosed that corrects database replication errors. The approach runs a replication tool that replicates a source database of a source database type to a target database of a target database type. When a replication error is encountered that cannot be resolved by the replication tool, the approach matches the replication error to a business logic recovery rule that is selected from a set of business logic recovery rules that are external to the replication tool. The matching business logic recovery rule is applied to the replication error to correct the replication error.

20 Claims, 5 Drawing Sheets

100

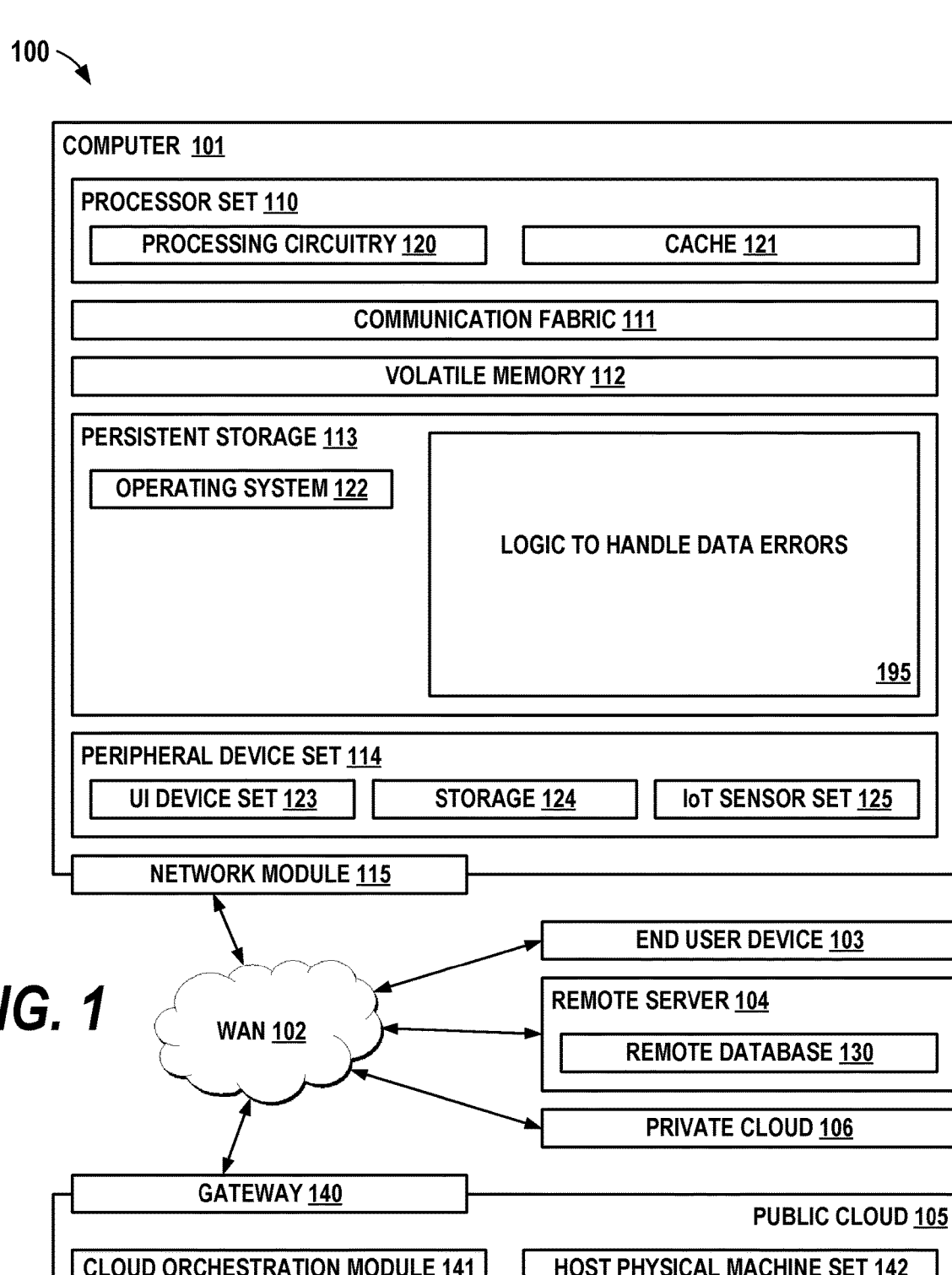

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

LOGIC TO HANDLE DATA ERRORS

195

PERIPHERAL DEVICE SET 114

UI DEVICE SET 123          STORAGE 124          IoT SENSOR SET 125

NETWORK MODULE 115

END USER DEVICE 103

REMOTE SERVER 104

REMOTE DATABASE 130

WAN 102

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

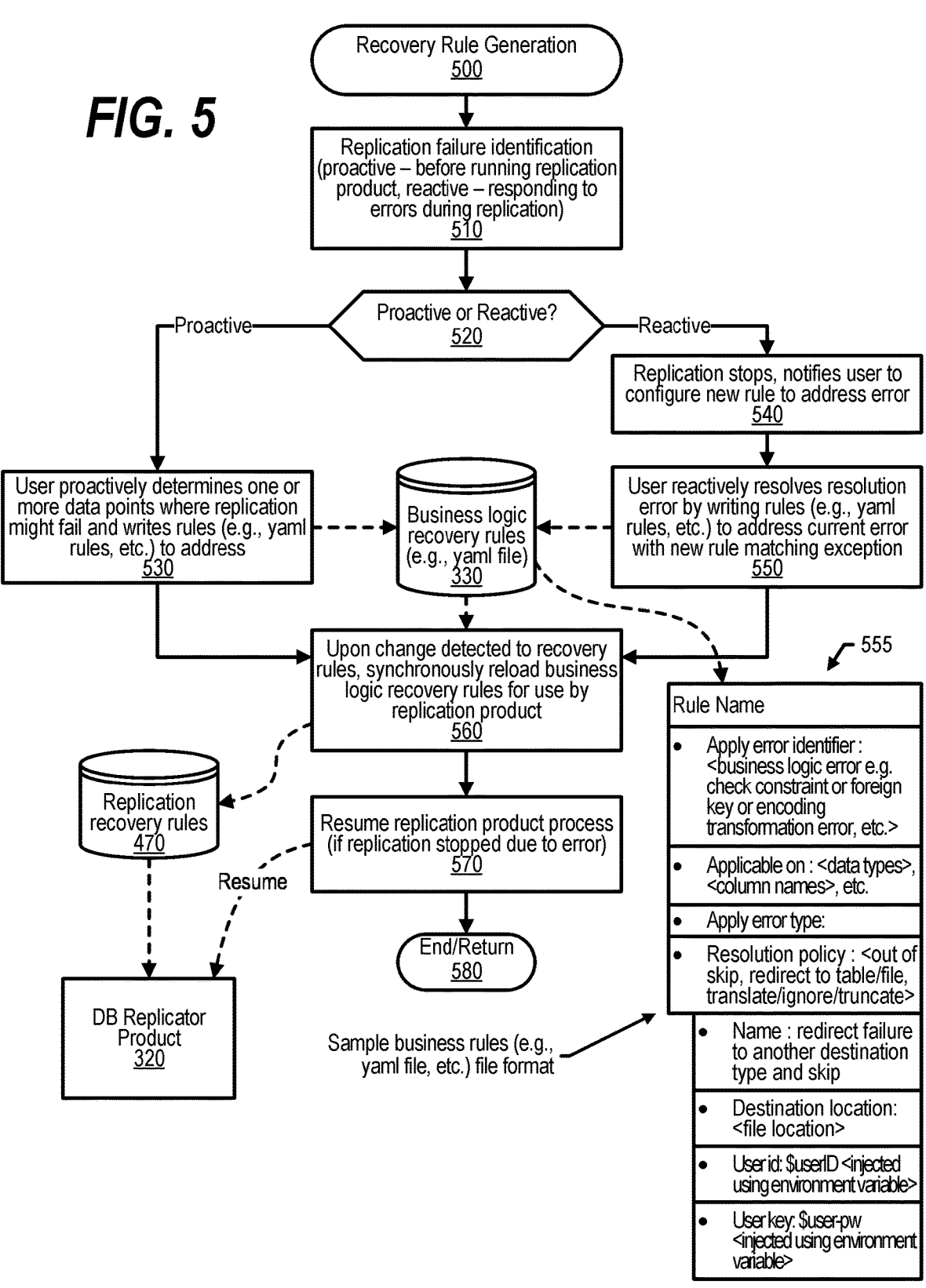

Recovery Rule Generation
500

Replication failure identification
(proactive – before running replication
product, reactive – responding to
errors during replication)
510

Proactive or Reactive?
520

Proactive

Reactive

Replication stops, notifies user to
configure new rule to address error
540

User proactively determines one or
more data points where replication
might fail and writes rules (e.g., yaml
rules, etc.) to address
530

Business logic
recovery rules
(e.g., yaml file)
330

User reactively resolves resolution
error by writing rules (e.g., yaml
rules, etc.) to address current error
with new rule matching exception
550

Upon change detected to recovery
rules, synchronously reload business
logic recovery rules for use by
replication product
560

555

Replication
recovery rules
470

Resume replication product process
(if replication stopped due to error)
570

Resume

End/Return
580

DB Replicator
Product
320

Sample business rules (e.g.,
yaml file, etc.) file format

Rule Name

• Apply error identifier :
  <business logic error e.g.
  check constraint or foreign
  key or encoding
  transformation error, etc.>

• Applicable on : <data types>,
  <column names>, etc.

• Apply error type:

• Resolution policy : <out of
  skip, redirect to table/file,
  translate/ignore/truncate>

• Name : redirect failure
    to another destination
    type and skip

• Destination location:
    <file location>

• User id: $userID <injected
    using environment variable>

• User key: $user-pw
    <injected using environment
    variable>

HANDLING DATA ERRORS

BACKGROUND

Every type of database has a set of features and limitations. Each type of database supports a set of data types. A data type supported by one type of database might not be supported by another type of database. Enterprise data is utilized by various areas in an organization. Based on the functions performed by the organization areas and data needs and requirements of such organization areas, one organization area might use one type of database for the same set of enterprise data that another area uses a different type of database. Replication tools are utilized to automatically convert data stored in one type of database and store it in a different type of database. Because of the features and limitations of the different database types, errors can result during replication.

SUMMARY

An approach is disclosed that corrects database replication errors. The approach runs a replication tool that replicates a source database of a source database type to a target database of a target database type. When a replication error is encountered that cannot be resolved by the replication tool, the approach matches the replication error to a business logic recovery rule that is selected from a set of business logic recovery rules that are external to the replication tool. The matching business logic recovery rule is applied to the replication error to correct the replication error.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein:

FIG. 1 is a block diagram of a data processing system in which the methods described herein can be implemented;

FIG. 5 is a flowchart depicting steps used to generate recovery rules during the processing of replication data errors based on business logic.

DETAILED DESCRIPTION

Figure 2:
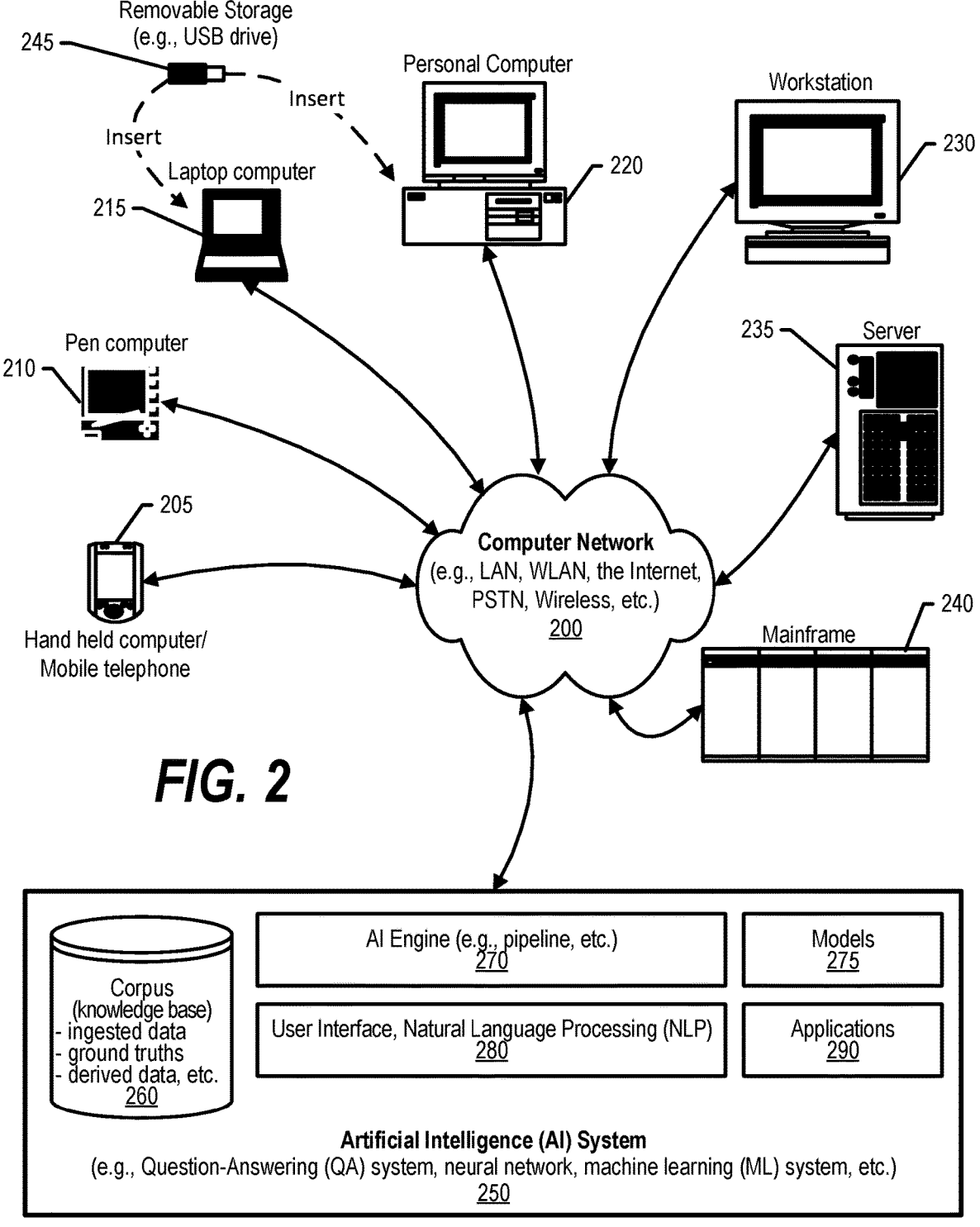
FIG. 2 provides an extension of the information handling system environment shown in FIG. 1 to illustrate that the methods described herein can be performed on a wide variety of information handling systems which operate in a networked environment.

FIGS. 1-5 describe an approach to handle database replication data errors due to business use cases specific to the databases used by an organization. Replication tools have some forms of error handling due to compatibility between a source and target database. However, because replication tools are not industry-specific, errors resulting from business use cases are not automatically handled. For example, a replication error due to data being written to a business-specific target column in a target database is not automatically handled and causes the replication process to halt.

The approach allows a user to inject business logic into the database replication process to handle data conversion errors that are not handled by database replication products and tools. The approach can be integrated with database replication technologies to automatically correct business-logic errors encountered during replication. Examples of business logic errors can be when a target table may have a check constraint on a column or when the target table is a child of some other table when only the child table is being replicated. The approach uses rules that are created by the business. In one embodiment, the rules are not specific to any particular column or data and can be generalized to any column and for any data. Business logic intentions are injected into the replication process and these business logic intentions can be recorded and captured during replication run-time.

Business logic rules provided by the business can be defined in a wide variety of ways. The rules can be quite simple, such as to continue on an error code and logging failed data to another database location. Rules can be used to state the translation of the data to a compatible range of database types. On the other hand, rules can be complex and can provide functional descriptive material (e.g., script, program, sql, etc.) that can handle a wide variety of situations.

In the approach, when a replication product encounters an unknown error and cannot automatically recover from the error, a business user inspects the failure caused by the unknown error and generalizes the error and its recovery procedure for the entire database replication across multiple database replications. The error and the business logic recovery corresponding to the error are recorded (e.g., in a yaml file, etc.) and the business logic recovery is then injected into the replication setup so that the replication process can now recover when the error is encountered. When the replication process is restarted, the business logic recovery logic now applied when the error is encountered. In one embodiment, the user can provide business logic recovery steps outside of the replication process so that the recovery logic is available when the replication process first encounters the error.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Various aspects of the present disclosure are described by narrative text, flowcharts, block diagrams of computer systems and/or block diagrams of the machine logic included in computer program product (CPP) embodiments.

With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a data processing system in which the methods described herein can be implemented. Computing environment 100 contains an example of an environment for the execution of at least some of the computer code involved in performing the inventive methods, such as shown in the description of block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A NETWORKED ENVIRONMENT is shown in FIG. 2. The networked environment provides an extension of the information handling system shown in FIG. 1 illustrating that the methods described herein can be performed on a wide variety of information handling systems that operate in a networked environment, depicted by computer network 200. Types of computer networks can include local area networks (LANs), wide area networks (WANs), the Internet, peer-to-peer networks, public switched telephone networks (PSTNs), wireless networks, etc. Types of information handling systems range from small handheld devices, such as handheld computer/mobile telephone 205 to large mainframe systems, such as mainframe computer 240. Examples of handheld computer 205 include smart phones, personal digital assistants (PDAs), personal entertainment devices, such as MP3 players, portable televisions, and compact disc players. Other examples of information handling systems include pen, or tablet, computer 210, laptop, or notebook, computer 215, personal computer 220, workstation 230, and server computer system 235. Other types of information handling systems that are not individually shown in FIG. 2 can also be interconnected other computer systems via computer network 200.

Many of the information handling systems include nonvolatile data stores, such as hard drives and/or nonvolatile memory depicted in FIG. 1. These nonvolatile data stores and/or memory can be included, or integrated, with a particular computer system or can be an external storage device, such as an external hard drive. In addition, removable nonvolatile storage device 245 can be shared among two or more information handling systems using various techniques, such as connecting the removable nonvolatile storage device 245 to a USB port or other connector of the information handling systems.

An ARTIFICIAL INTELLIGENCE (AI) SYSTEM is depicted at the bottom of FIG. 2. Artificial intelligence (AI) system 250 is shown connected to computer network 200 so that it is accessible by other computer systems 205 through 240. AI system 250 runs on one or more information handling systems (comprising one or more processors and one or more memories, and potentially any other computing device elements generally known in the art including buses, storage devices, communication interfaces, and the like) that connects AI system 250 to computer network 200. The network 200 may include multiple computing devices 104 in communication with each other and with other devices or components via one or more wired and/or wireless data communication links, where each communication link may comprise one or more of wires, routers, switches, transmitters, receivers, or the like. AI system 250 and network 200 may enable functionality, such as question/answer (QA) generation functionality, for one or more content users. Other embodiments of AI system 250 may be used with components, systems, sub-systems, and/or devices other than those that are depicted herein.

AI system 250 maintains corpus 260, also known as a "knowledge base," which is a store of information or data that the AI system draws on to solve problems. This knowledge base includes underlying sets of facts, ground truths, assumptions, models, derived data, and rules which the AI system has available in order to solve problems. In one embodiment, a content creator creates content in corpus 260. This content may include any file, text, article, or source of data for use in AI system 250. Content users may access AI system 250 via a network connection or an Internet connection to the network 200, and, in one embodiment, may input questions to AI system 250 that may be answered by the content in the corpus of data. As further described below, when a process evaluates a given section of a document for semantic content, the process can use a variety of conventions to query it from the AI system.

AI system 250 may be configured to receive inputs from various sources. For example, AI system 250 may receive input from the network 200, a corpus of electronic documents or other data, a content creator, content users, and other possible sources of input. In one embodiment, some or all of the inputs to AI system 250 may be routed through the network 200. The various computing devices on the network 200 may include access points for content creators and content users. Some of the computing devices may include devices for a database storing the corpus of data. The network 200 may include local network connections and remote connections in various embodiments, such that AI system 250 may operate in environments of any size, including local and global, e.g., the Internet. Additionally, AI system 250 serves as a front-end system that can make available a variety of knowledge extracted from or represented in documents, network-accessible sources and/or structured data sources. In this manner, some processes populate the AI system with the AI system also including input interfaces to receive knowledge requests and respond accordingly.

AI Engine 270, such as a pipeline, is an interconnected and streamlined collection of operations. The information works its way into and through a machine learning system, from data collection to training models. During data collection, such as data ingestion, data is transported from multiple sources, such as sources found on the Internet, into a centralized database stored in corpus 260. The AI system can then access, analyze, and use the data stored in its corpus.

Models 275 are the result of AI modeling. AI modeling is the creation, training, and deployment of machine learning algorithms that emulate logical decision-making based on the data available in the corpus with the system sometimes utilizing additional data found outside the corpus. AI models 275 provide AI system 250 with the foundation to support advanced intelligence methodologies, such as real-time analytics, predictive analytics, and augmented analytics.

User interface 280, such as Natural Language (NL) Processing (NLP) is the interface provided between AI system 200 and human uses. Semantic content is content based on the relation between signifiers, such as words, phrases, signs, and symbols, and what they stand for, their denotation, or connotation. In other words, semantic content is content that interprets an expression, such as by using NLP. Semantic data is stored as part of corpus 260. In one embodiment, the process sends well-formed questions (e.g., natural language questions, etc.) to the AI system. AI system 250 may interpret the question and provide a response to the content user containing one or more answers to the question.

In some embodiments, AI system 250 may provide a response to users in a ranked list of answers. Other types of user interfaces (UIs) can also be used with AI system 250, such as a command line interface, a menu-driven interface, a Graphical User Interface (GUI), a Touchscreen Graphical User Interface (Touchscreen GUI), and the like.

AI applications 290 are various types of AI-centric applications focused on one or more tasks, operations, or environments. Examples of different types of AI applications include search engines, recommendation systems, virtual assistants, language translators, facial recognition and image labeling systems, and question-answering (QA) systems.

In some illustrative embodiments, AI system 250 may be a question/answering (QA) system, which is augmented with the mechanisms of the illustrative embodiments described hereafter. A QA type of AI system 250 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the I QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Figure 3:
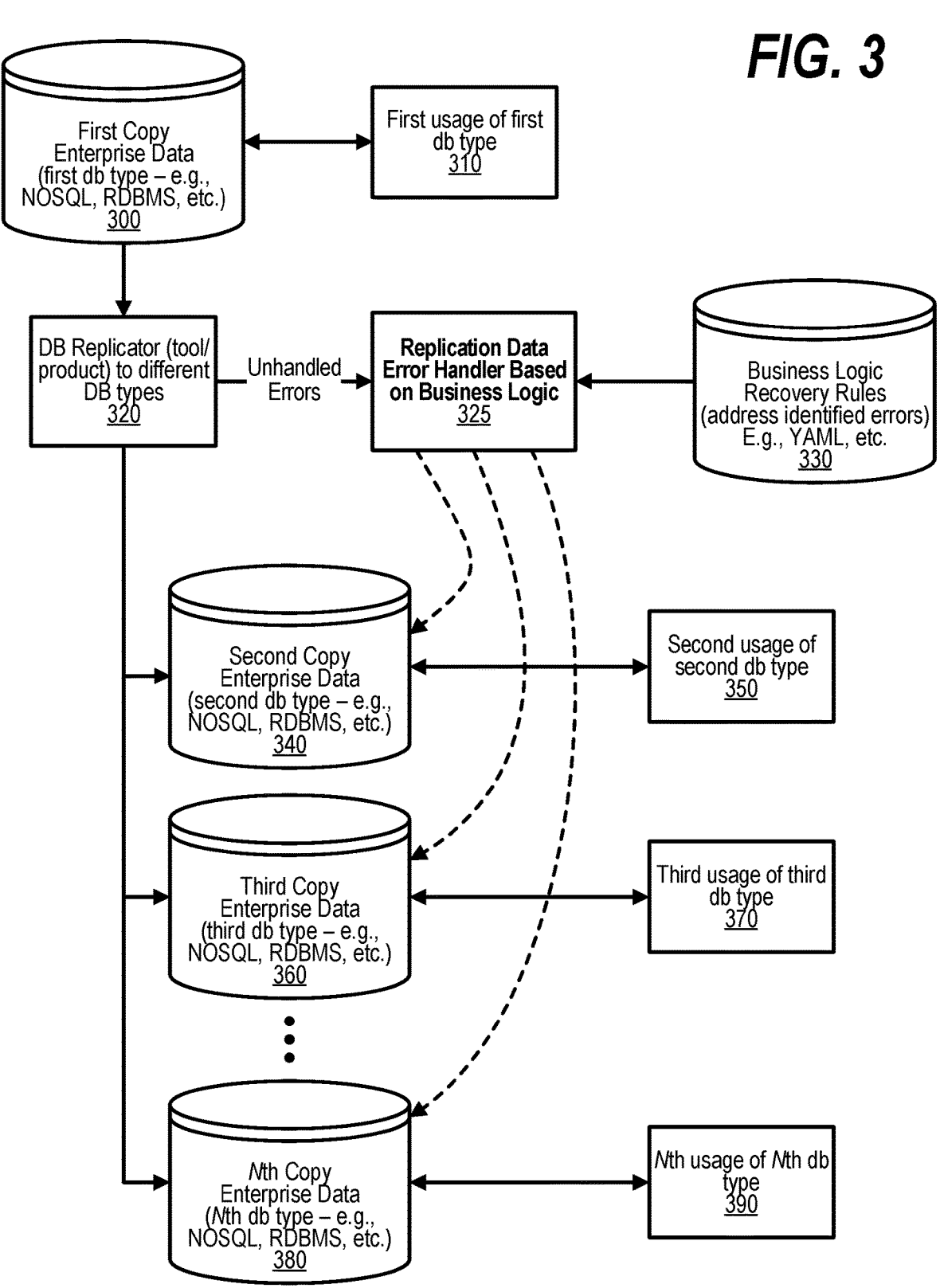
FIG. 3 is a component diagram depicting data stores and processes to address replication data errors based on business logic.

FIG. 3 is a component diagram depicting data stores and processes to address replication data errors based on business logic. First copy 300 of a database is in a first type of database, such as a NoSQL database, a distributed database, an object-oriented database, a relational database, etc. First usage 310 depicts the area or group that is using first copy 300 (e.g., writing records, reading records, etc.). Replicator tool 320 is a database replicator application (e.g., software product, etc.) designed to replicate the data from one type of database to another type of database. Some replicator tools have some amount of error correcting logic. However, as previously explained, the replication error recovery native to a recovery tool does not handle business logic errors.

Database replicator tool 320 is shown replicating the data from first copy 300 of a first database type to a second copy 340 of a the data in a second database type, a third copy 360 of a the data in a third database type, through an N$^{th}$ copy first 380 of a the data in an N$^{th}$ database type. The usage of copies 340, 360, and 380 are by usage areas 350, 370, and 390, respectively.

When replicating data from first copy 300 to the other copies of the data in other database types, various replication errors can occur. Some of the errors are not due to the business environment and are, instead, due to technical differences between the source and target database types. These errors are often handled by database replicator tool 320. However, unhandled errors, those not able to be handled by the database replicator tool, are shown being handled by replication data error handler 325 that handles, or resolves the replication errors based on business logic gathered from the organization. For example, a business logic error might occur when a check to a target column that is business specific with data that is being replicated to the target column failing due to a business check that is performed and the data failing the check. These replication errors are matched to a business logic recovery rule that is selected from various business logic recovery rules that are stored in Business Logic Recovery Rules data store 330. In one embodiment, Business Logic Recovery Rules stored in data store 330 are written in a human-readable data-serialized language, such as YAML, etc.

Figure 4:
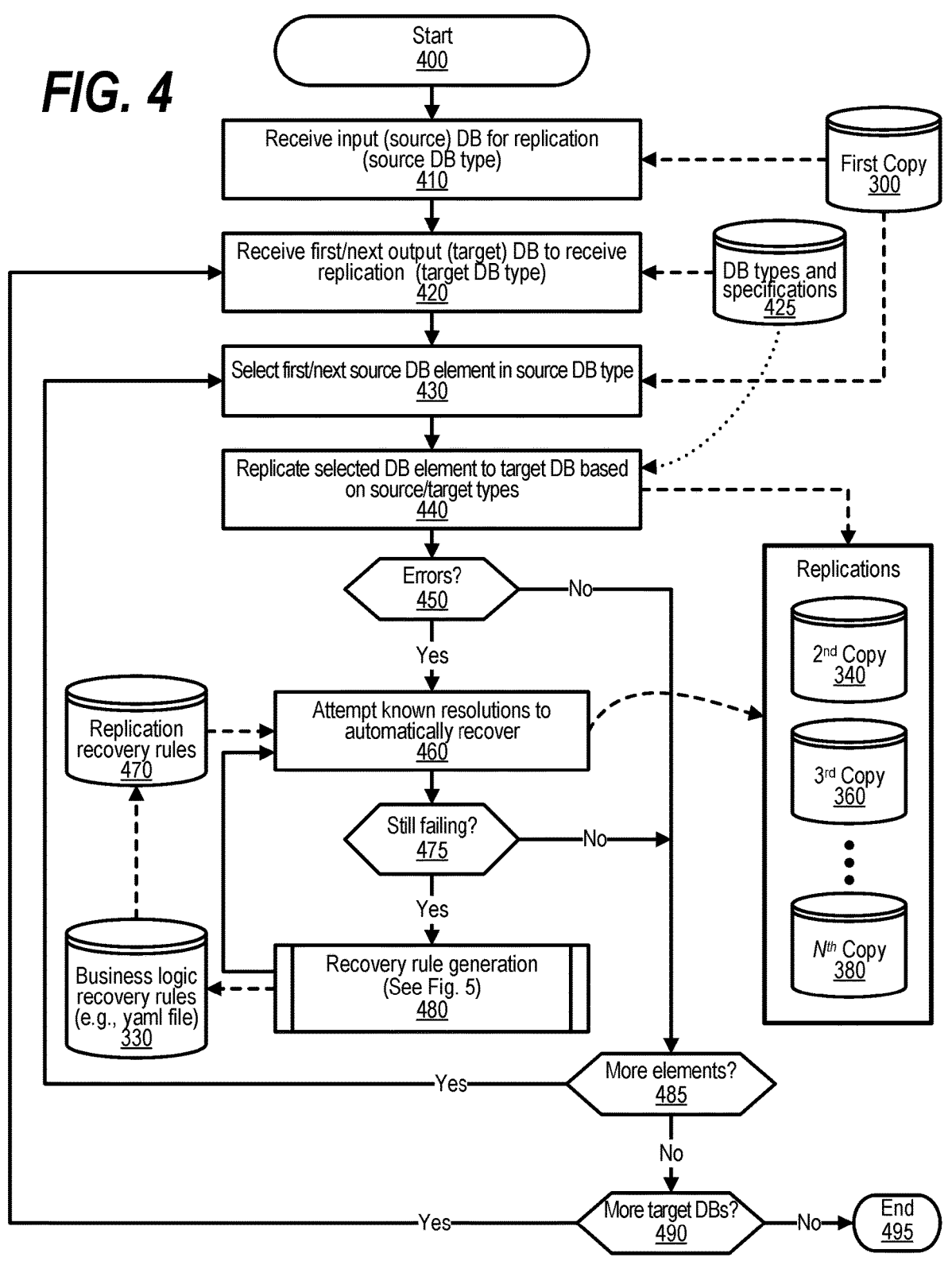
FIG. 4 is a flowchart depicting steps used to address replication data errors based on business logic.

FIG. 4 is a flowchart depicting steps used to address replication data errors based on business logic. FIG. 4 processing commences at 400 and shows the steps taken by a process that performs database replication and utilizes business logic recovery rules.

At step 410, the process receives an input (source) database (first copy 300) for replication (source DB type). The source database has the data that is being replicated to other databases in other database types. At step 420, the process receives the first output (target) database that will receive the replicated data. These target database types are shown as copies 340, 360, and 380. Data store 425 stores a list of the various target databases and their database types.

At step 430, the process selects the first source database element from the source database which is stored in a source database type. At step 440, the process uses a replication tool to replicate the selected database element to the target database based on the source and target database types (e.g., converting datatypes where needed, etc.). The replicated elements (data) are stored in the database copies with different database types (shown as copies 340, 360, and 380).

The replication process determines as to whether errors occurred while replicating the database element at step 440 (decision 450). If errors occurred while replicating the database element, then decision 450 branches to the 'yes' branch for error handling. On the other hand, if no errors occurred, then decision 450 branches to the 'no' branch bypassing error handling steps.

Steps 460 through 480 are performed during error handling. At step 460, the replication process attempts known resolutions to automatically recover. The replication recovery rules are retrieved from data store 470. The process determines as to whether the replication of the database element is still failing after attempting known recovery resolutions (decision 475). If replication of the database element is still failing after attempting known recovery resolutions, then decision 475 branches to the 'yes' branch whereupon, at predefined process 480, the process performs the Recovery Rule Generation Routine to generate a new recovery rule based on business logic (see FIG. 5 and corresponding text for processing details).

The result of predefined process 480 are additional business logic recovery rules that are stored in data store 330. In one embodiment, the business logic recovery rules are injected into overall replication recovery rules (data store 470) so that the replication tool can automatically apply them when needed. On the other hand, if replication of the database element is no longer failing, then decision 475 branches to the 'no' branch bypassing predefined process 480.

Once the element has been processed, the replication process determines whether there are more database elements to process (decision 485). If there are more database elements to process, then decision 485 branches to the 'yes' branch which loops back to step 430 to select and process the next database element as described above. This looping continues until all of the database elements have been processed (replicated), at which point decision 485 branches to the 'no' branch exiting the loop.

The process next determines whether there are more target databases to which to replicate the data from the source database (decision 490). If there are more target databases to which to replicate the data from the source database, then decision 490 branches to the 'yes' branch which loops back to step 420 to select and replicate data to the next target database. This looping continues until the source database has been replicated to all of the target databases have, at which point decision 490 branches to the 'no' branch exiting the loop. FIG. 4 processing thereafter ends at 495.

FIG. 5 is a flowchart depicting steps used to generate recovery rules during the processing of replication data errors based on business logic. FIG. 5 processing commences at 500 and shows the steps taken by the Recovery Rule Generation process that generates business logic recovery rules.

At step 510, the process identifies replication failure generation as being either "proactive" (performed before the running of the replication product), or "reactive" (performed responsive—reactive—to errors encountered during an active replication process. The process determines as to whether the routine is being executed proactively or reactively (decision 520). If proactive execution, then decision 520 branches to the 'proactive' branch whereupon at step 530, the process works with one or more users to proactively determine one or more data points where replication might fail and the users write business logic recovery rules to correct such business logic errors that might occur during replication. These recovery rules are stored in business logic recovery rules data store 330.

On the other hand, if the routine is being run in a "reactive" mode, then decision 520 branches to the 'reactive' branch whereupon at step 540, the replication process halts (stops) and notifies the user to configure a new business logic rule to address the replication error. Then, at step 550, the process stores the business logic recovery rule written by the user to the set of business logic recovery rules that are stored in data store 330. to address the currently occurring replication error with a new rule matching the exception.

A sample rule format is shown in 555 of one business logic rule that is written to data store 330. The format includes a rule name, an applied error identifier (such as business logic error to check constraint or foreign key encoding transformation error, etc.), an applicable range (e.g., one or more data types, column names, etc.), an apply error type, a resolution policy that might include a name to redirect the failure to another destination type and skip, to an external file location, an injection of a user identifier, and an injection of a user password.

At step 560, upon change detected to recovery rules, the process synchronously reloads the business logic recovery rules from data store 330 for use by the replication tool. In one embodiment, the reloading includes injecting the business logic recovery rules into replication recovery rules data store 470 that are used by replication tool 320. At step 570, the process resumes the replication process performed by the replication tool (if the replication was stopped due to an error in the replication process). FIG. 5 processing thereafter ends (if in proactive mode) or returns to the calling routine (if in reactive mode) at 580.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
running a replication tool that replicates a source database of a source database type to a target database of a target database type; and
in response to encountering a replication error that cannot be resolved by the replication tool:
matching the replication error to a business logic recovery rule selected from a plurality of business logic recovery rules, wherein the plurality of business logic recovery rules are stored in a business logic recovery rules data store that is external to the replication tool; and
applying the business logic recovery rule to the replication error, wherein the applying of the business logic recovery rule corrects the replication error.

2. The method of claim 1, wherein the running of the replication tool is halted when the replication error is encountered, the method further comprising:
resuming the running of the replication tool at a point in the replication where the replication error was encountered.

3. The method of claim 1, further comprising:
in response to failing to match the replication error to one of the plurality of business logic recovery rules:
receiving the business logic recovery rule from a user of the replication tool; and writing the business logic recovery rule to the plurality of business logic recovery rules.

4. The method of claim 1, further comprising:

determining one or more data points in the replication of the source database to the target database where replication may fail; and writing one or more of the plurality of business logic recovery rules.

5. The method of claim 1, wherein the plurality of business logic recovery rules are written in a human-readable data-serialization language.

6. The method of claim 5, wherein the plurality of business logic recovery rules include a rule name, an error identifier, an applicable range, an error type, and a resolution policy.

7. The method of claim 1, further comprising:

injecting the plurality of business logic recovery rules into a set of native replication tool recovery resolutions.

8. An information handling system comprising:

a processor set;

one or more computer readable storage media; and program instructions stored on the one or more computer readable storage media to cause the processor set to perform operations comprising:

running a replication tool that replicates a source database of a source database type to a target database of a target database type; and in response to encountering a replication error that cannot be resolved by the replication tool:

matching the replication error to a business logic recovery rule selected from a plurality of business logic recovery rules, wherein the plurality of business logic recovery rules are stored in a business logic recovery rules data store that is external to the replication tool; and applying the business logic recovery rule to the replication error, wherein the applying of the business logic recovery rule corrects the replication error.

9. The information handling system of claim 8, wherein the running of the replication tool is halted when the replication error is encountered comprises:

resuming the running of the replication tool at a point in the replication where the replication error was encountered.

10. The information handling system of claim 8, wherein the operations further comprise:

in response to failing to match the replication error to one of the plurality of business logic recovery rules:

receiving the business logic recovery rule from a user of the replication tool; and writing the business logic recovery rule to the plurality of business logic recovery rules.

11. The information handling system of claim 8, wherein the operations further comprise:

determining one or more data points in the replication of the source database to the target database where replication may fail; and writing one or more of the plurality of business logic recovery rules.

12. The information handling system of claim 8, wherein the plurality of business logic recovery rules are written in a human-readable data-serialization language.

13. The information handling system of claim 12, wherein the plurality of business logic recovery rules include a rule name, an error identifier, an applicable range, an error type, and a resolution policy.

14. The information handling system of claim 8, wherein the operations further comprise:

injecting the plurality of business logic recovery rules into a set of native replication tool recovery resolutions.

15. A computer program product comprising:

one or more computer readable storage media; and program instructions stored on the one or more computer readable storage media to perform operations comprising:

running a replication tool that replicates a source database of a source database type to a target database of a target database type; and in response to encountering a replication error that cannot be resolved by the replication tool:

matching the replication error to a business logic recovery rule selected from a plurality of business logic recovery rules, wherein the plurality of business logic recovery rules are stored in a business logic recovery rules data store that is external to the replication tool; and applying the business logic recovery rule to the replication error, wherein the applying of the business logic recovery rule corrects the replication error.

16. The computer program product of claim 15, wherein the running of the replication tool is halted when the replication error is encountered comprises:

resuming the running of the replication tool at a point in the replication where the replication error was encountered.

17. The computer program product of claim 15, wherein the operations further comprise:

in response to failing to match the replication error to one of the plurality of business logic recovery rules:

receiving the business logic recovery rule from a user of the replication tool; and writing the business logic recovery rule to the plurality of business logic recovery rules.

18. The computer program product of claim 15, wherein the operations further comprise:

determining one or more data points in the replication of the source database to the target database where replication may fail; and writing one or more of the plurality of business logic recovery rules.

19. The computer program product of claim 15, wherein the plurality of business logic recovery rules are written in a human-readable data-serialization language.

20. The computer program product of claim 19, wherein the plurality of business logic recovery rules include a rule name, an error identifier, an applicable range, an error type, and a resolution policy.

\* \* \* \* \*